United States Patent Office 3,497,519
Patented Feb. 24, 1970

3,497,519
THIENYL-ALKYL ESTERS OF 1-(3-CYANO-3,3-DI-PHENYL - PROPYL) - 4 - PHENYL - PIPERIDINE-4-CARBOXYLIC ACID
Paul Adriaan Jan Janssen, Vosselaar, Belgium, assignor to Janssen Pharmaceutica, a corporation of Belgium
No Drawing. Filed Nov. 22, 1967, Ser. No. 684,965
Int. Cl. C07d 29/36
U.S. Cl. 260—293.4
5 Claims

ABSTRACT OF THE DISCLOSURE

The invention includes (A) compounds of the class of 1-(3-cyano-3,3-diphenyl-propyl) - 4 - phenyl - piperidine-4-carboxylic acid esters in which the ester function is a thienyl-alkyl group, which compounds are useful as antidiarrheal agents; and (B) compounds of the class of thienyl-alkyl esters of 4-phenyl-piperidine-4-carboxylic acid which are useful as intermediates in the preparation of compounds (A).

---

The present invention relates to certain thienyl-lower alkyl esters of 1-(3-cyano-3,3-diphenyl-propyl)-4-phenyl-piperidine-4-carboxylic acid having anti-diarrheal activity and the therapeutically active acid addition salts thereof. The novel esters herein may be structurally represented by the formula:

$$\text{Ph}-\underset{\underset{\text{Ph}}{|}}{\overset{\underset{|}{\text{CN}}}{\text{C}}}-\text{CH}_2\text{CH}_2-\text{N}\underset{\text{Ph}}{\bigotimes}\text{C}-\text{O}-\text{Alk}-\text{R} \quad (\text{I})$$

wherein Ph is phenyl, Alk represents an alkylene chain of from 1 to 5 carbon atoms and R is thienyl, preferably 2-thienyl.

The compounds of Formula I are conveniently prepared by the condensation of an appropriate 2,2-diphenyl-4-X-butyronitrile of Formula II, for example, the 4-halo derivative, with an appropriate thienyl-alkyl ester of 4-phenyl-piperidine-4-carboxylic acid (III) which may be advantageously used in the form of its acid addition salt, such as, for example, a hydrohalide. Said esters of Formula III, as well as the acid addition salts thereof, are novel compounds and, as such, constitute an additional part of this invention. The condensation reaction can be carried out in such organic solvents as the aromatic hydrocarbons, e.g., benzene, toluene, xylene and the like, lower alkanols and lower alkanones. Since in the condensation an equivalent of acid (HX) is liberated, it is desirable to use an appropriate amount of a suitable base, e.g., an alkali metal carbonate, a trialkylamine, pyridine or the like, to combine with the acid released. The reaction scheme may be illustrated as follows:

$$\text{Ph}-\underset{\underset{\text{Ph}}{|}}{\overset{\underset{|}{\text{CN}}}{\text{C}}}-\text{CH}_2\text{CH}_2-\text{X} + \text{HN}\underset{\text{Ph}}{\bigotimes}\text{C}-\text{O}-\text{Alk}-\text{R} \xrightarrow{\text{base}} (\text{I})$$

(II)                        (III)

wherein Ph, Alk and R are as heretofore described and X stands for a reactive ester of the corresponding alcohol with strong inorganic or organic acids such as hydrochloric, hydrobromic, hydriodic, sulfuric, methanesulfonic, toluenesulfonic and the like acids.

The compounds of Formula II used as starting materials above are known. When X is halo, such as chloro or bromo, they are conveniently prepared according to the method of Dupre et al., J.C.S., 1949:505. The esters (III) are readily obtained by reacting 4-halocarbonyl-4-phenyl-piperidine (IV, the halo of which is preferably chloro or bromo, with an alcohol (V) of the formula HO—Alk—R in a suitable organic solvent, e.g., anhydrous toluene. The acid addition salt of (IV) may also be employed whereby the corresponding acid addition salt of (III) will be obtained.

$$\text{H}-\text{N}\underset{\text{Ph}}{\bigotimes}\overset{\overset{\text{O}}{\|}}{\text{C}}-\text{Cl} + \text{HO}-\text{Alk}-\text{R} \longrightarrow (\text{III})$$

(IV)           (V)

An alternative method of preparing the compounds of Formula I is to use the corresponding free acid form of (III) in lieu of the ester, typically in an alcoholic solvent in the presence of a base such as sodium carbonate, and to esterify the corresponding acid form of (I) that is produced with an alcohol of the formula HO—Alk—R.

Another procedure employs as the starting material di-phenyl-acetonitrile which is reacted with a metallorganic reagent to form the α-metallo derivative:

$$\text{Ph}-\underset{\underset{\text{Ph}}{|}}{\overset{\underset{|}{\text{CN}}}{\text{C}}}-\text{Metal}$$

which is then condensed with a corresponding 1-haloethyl-piperidine derivative of the formula:

$$\text{halo-CH}_2\text{CH}_2-\text{N}\underset{\text{Ph}}{\bigotimes}\overset{\overset{\text{O}}{\|}}{\text{C}}-\text{O}-\text{Alk}-\text{R}$$

with elimination of the metal halide.

The organic bases of Formula I may be converted to the corresponding therapeutically useful acid addition salts by reaction with an appropriate inorganic acid, such as, for example, hydrochloric, hydrobromic, hydriodic, sulfuric, phosphoric and the like acids, or with an appropriate organic acid, such as, for example, acetic, propionic, glycolic, lactic, oxalic, malonic, tartaric, citric, sulfamic, ascorbic and the like acids. The organic bases of Formula III may likewise be converted to corresponding acid addition salts by reaction with appropriate inorganic and organic acids. In turn, the salts of Formulas I and III may be converted to the corresponding base form by conventional reaction with suitable alkali.

The compounds (I) of this invention, in base or salt form, are highly active inhibitors of gastro-intestinal propulsion and defecation and are therefore useful in the treatment of diarrhea. The anti-diarrheal activity of the such compounds has been observed in experiment animals according to the following test procedure. Young female Wistar rats (230–250 g. body weight) are fasted overnight and in the morning each animal is treated orally with a dose level (40, 20, 10, 5, 2.5, 1.25, 0.63 mg./kg.) of the compound to be tested (10 ml./kg.). One hour thereafter, the animal receives 1 ml. of ricinus oil orally. Each animal is kept in an individual cage. At different time intervals (1, 2, 3, 4, 6 and 8 hours) after the ricinus oil treatment, the presence or absence of diarrhea is noted. In more than 95% of 250 control animals, severe diarrhea is observed 1 hour after treatment with ricinus oil. Using this all-or-none criterium, a significant positive effect occurs with the tested compound if no diarrhea is observed 1 hour after the ricinus oil treatment in at least two out of ten rats per dose level [= lowest effective dose (LED) in mg./kg. orally]. A minimum of 5 dose levels are used per drug, each dose level being given to 10 rats on ten different days. For example, according to this procedure, the preferred compound, 2-(2-thienyl)-ethyl 1-(3-cyano-3,3-diphenyl-propyl) - 4 - phenyl-piperidine-4-carboxylate hydrochloride, has an LED of 0.31 mg./kg. orally. In view of their useful anti-diarrheal activity, the subject compounds may be formulated in various forms, e.g., liquids, powders, tablets, capsules and the like, according to conventional pharmaceutical techniques.

Due to their inherent relationship to isonipecotic acid, the compounds of Formula I may be alternatively denoted as thienyl-alkyl 1-(3-cyano-3,3-diphenyl-propyl)-4-phenyl-isonipecotates; and compounds of Formula III as thienyl-alkyl 4-phenyl-isonipecotates.

The compounds which constitute this invention and the methods for their preparation will appear more fully from a consideration of the following examples, which are given for the purpose of illustration only and are not to be construed as limiting the invention in spirit. In these examples, quantities unless otherwise stated are indicated as parts by weight.

EXAMPLE I

To a suspension of 52 parts of 4-chlorocarbonyl-4-phenyl-piperidine hydrochloride in 560 parts of anhydrous toluene is added a solution of 38.4 parts of 2-(2-thienyl)-ethanol in 160 parts of anhydrous toluene and the whole is stirred and refluxed for 6 hours. The reaction mixture is filtered hot and the filtrate is evaporated. The oily residue is dissolved in water and 2 parts of hydrochloric acid are added. The solution is washed with diisopropylether, alkalized and the product is extracted with diisopropylether. The extract is dried, filtered and evaporated. The oily free base is again converted into its hydrochloride salt in the usual manner. The crude solid salt is filtered off and recrystallized from a mixture of acetone and 2-propanol and diisopropylether, yielding [2 - (2-thienyl)-ethyl]-4-phenyl-isonipecotate hydrochloride; M.P. 153–154° C.

A mixture of 6 parts of parts of 4-bromo-2,2-diphenyl-butyronitrile, 5.9 parts of [2-(2-thienyl)-ethyl]-4-phenyl-isonipecotate hydrochloride, 5.3 parts of sodium carbonate, a few crystals of potassium iodide in 200 parts of 4-methyl-2-pentanone is stirred and refluxed for 68 hours. The reaction mixture is cooled and 50 parts of water are added. The organic layer is separated, dried, filtered and evaporated. The oily residue is dissolved in 320 parts of diisopropyl ether. This solution is filtered over activated charcoal and to the filtrate is added an excess of 2-propanol previously saturated with gaseous hydrogen chloride. The precipitated solid salt is filtered off and recrystallized from a mixture of acetone and diisopropyl-ether, yielding [2-(2-thienyl) - ethyl] - 1 - (3-cyano-3,3-diphenyl - propyl)-4-phenyl-isonipecotate hydrochloride; M.P. 188–189° C.

EXAMPLE II

The procedure of Example I are repeated except that an equivalent quantity of 3-(2-thienyl)-propanol and 5-(2-thienyl)-pentanol are used, respectively, in place of the 2-(2-thienyl)-ethanol used therein to yield, as respective products, the hydrochloride salt of the corresponding 3-(2-thienyl)-propyl and 5-(2-thienyl)-pentyl esters of 1 - (3-cyano-3,3-diphenyl-propyl)-4-phenyl-piperidine-4-carboxylic acid.

What is claimed is:
1. A member selected from the group consisting of thienyl-lower alkyl esters of 1-(3-cyano-3,3-diphenyl-propyl)-4-phenyl-piperidine-4-carboxylic acid and the therapeutically active acid addition salts thereof.
2. The compound of claim 1 which is the 2-(2-thienyl)-ethyl ester of 1-(3-cyano-3,3-diphenyl-propyl)-4-phenyl-piperidine-4-carboxylic acid.
3. The compound of claim 1 which is the hydrochloride salt of 2-(2-thienyl)-ethyl 1-(3-cyano-3,3-diphenyl-propyl)-4-phenyl-piperidine-4-carboxylate.
4. A member selected from the group consisting of thienyl-lower alkyl esters of 4-phenyl-piperidine-4-carboxylic acid and the acid addition salts thereof.
5. The compound of claim 4 which is the 2-(2-thienyl)-ethyl ester of 4-phenyl-piperidine-4-carboxylic acid.

References Cited

UNITED STATES PATENTS

| 2,760,965 | 8/1956 | Feldkamp | 260—293.45 |
| 3,117,128 | 1/1964 | Mooradian | 260—293.45 |

HENRY R. JILES, Primary Examiner

S. D. WINTERS, Assistant Examiner

U.S. Cl. X.R.

260—465, 294, 332.3, 999